July 18, 1967     D. E. THOMAS, JR     3,331,101

SHAFT SEAL

Original Filed Sept. 3, 1963

INVENTOR.
DOYLE E. THOMAS, JR.,
BY Frank S. Troidl

ATTORNEY.

United States Patent Office 3,331,101
Patented July 18, 1967

3,331,101
SHAFT SEAL
Doyle E. Thomas, Jr., Baytown, Tex., assignor, by mesne assignments, to Esso Research and Engineering Company, Elizabeth, N.J., a corporation of Delaware
Continuation of application Ser. No. 306,004, Sept. 3, 1963. This application Aug. 22, 1966, Ser. No. 574,256
3 Claims. (Cl. 18—12)

This application is a continuation of my prior application Ser. No. 306,004 filed Sept. 3, 1963, and now abandoned.

This invention relates to machinery for handling high-viscosity materials. More particularly, this invention is a seal for machinery having rotatable shafts extending from an enclosure used for handling viscoelastic materials.

As used herein, the term "viscoelastic materials" means any material whose elastic properties are time dependent and will partly store mechanical energy of deformation and partly dissipate this energy as heat. Viscoelastic materials include materials such as high-viscosity, thermoplastic melts and other high-viscosity fluids such as rubbers, paraffins, and asphalts. The viscosity of the viscous materials may range from $.5 \times 10^6$ to $5 \times 10^6$ poises.

Figure 1:
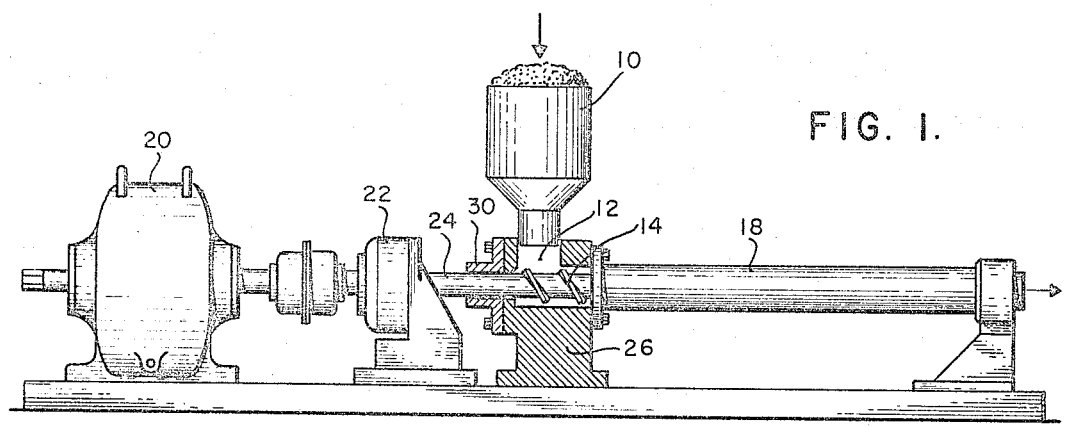
Figure 2:
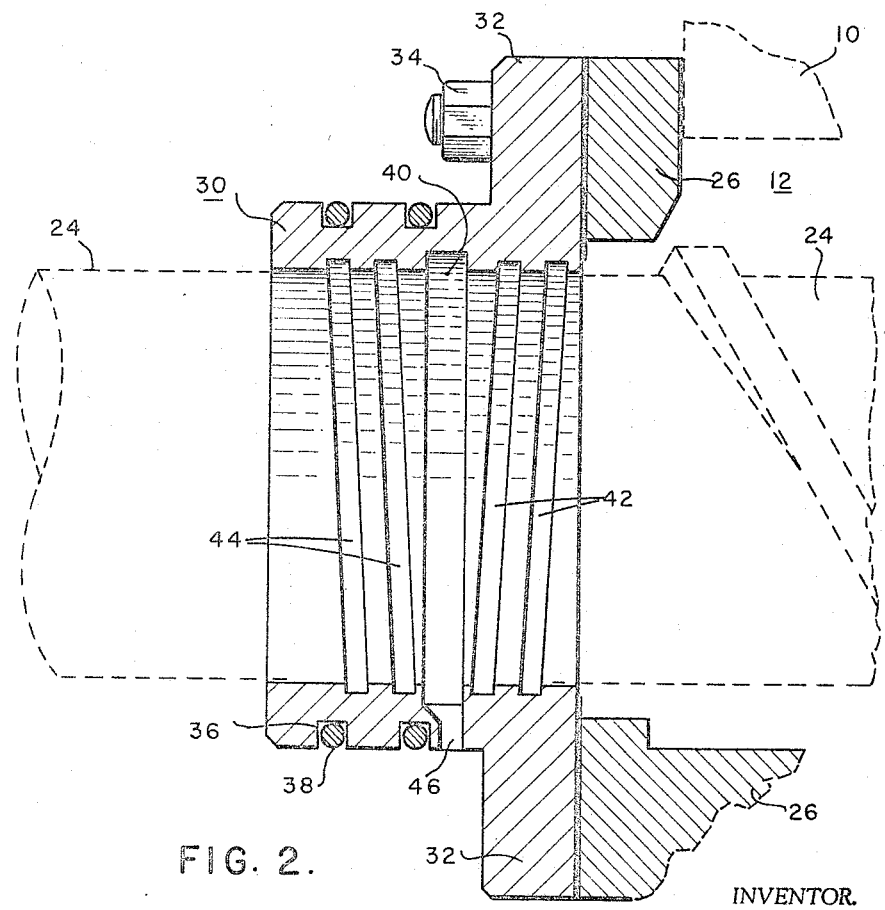

The invention, as well as its many advantages, may be further understood by reference to the following detailed description and drawing in which:

FIG. 1 is an elevational view, partly in section, showing my new seal used with an extruder; and
FIG. 2 is a sectional view of the seal.

Referring specifically to FIG. 1, the seal is shown about the rotatable shaft extending from an extruder used for handling high-viscosity, thermoplastic melts. However, it is to be understood that the seal has wide use with machinery used for handling viscous materials other than high-viscosity, thermoplastic melts.

The plastic material is fed from a hopper 10 through the feed throat 12 into the channel of a screw 14. The screw 14 extends along the barrel 18. The screw 14 is driven by a motor (not shown) through a gear reducer 20, and the rearward thrust of the screw 14 is absorbed by a thrust bearing 22. Heat is applied to the barrel 18 from external heaters (not shown), and the temperature is measured by thermocouples (not shown). As the plastic granules fed through hopper 10 are conveyed along the screw channel, they are melted. The melt is forced through a hole in the end of barrel 18.

The shaft 24 which is an integral part of the screw 14 extends from the enclosure 26 and is rotated by the gear reducer 20 through thrust bearing 22. The rotatable shaft 24 is of constant diameter throughout its length.

My new seal for machinery used for handling viscous materials is identified by the reference numerals 30 in FIG. 1. The seal 30 is connected to the enclosure 26. The inside surface of seal 30 is of a particular structure and is mounted about the rotatable shaft 24 with a close clearance. The amount of clearance may, for example, be about 0.020 inch diametrically.

The detailed structure of seal 30 is shown in FIG. 2. The seal 30 is provided with a circular flange 32 and attached to the enclosure 26 by means of the nut and bolt arrangement 34. The material of the seal 30 may be any suitable material used for machinery handling viscoelastic melts that is "wet" by the melt. Examples of suitable materials for seal 30 are brass and carbon steel.

The clearance between the inside surface of seal 30 and shaft 24 is the same along the length of the shaft 24. The seal 30 is also provided with circumferential grooves 36 about the outside surface. Coils 38 are positioned within the grooves 36 and used for controlling the temperature.

The inside surface of the seal 30 is provided with a circular groove 40 to provide a relief chamber for collecting thermoplastic melts. A first spiral groove 42 is also formed on the inside surface of the seal 30. The spiral groove 42 extends from the enclosure 26 to the circular chamber 40. The spiral groove 42 is cut in a manner to provide a surface adjacent the rotatable shaft 24 which feeds any material leaking from the enclosure 26 to the chamber 40.

A second spiral groove 44 is formed in the inside surface of the seal 30. The second spiral groove 44 is cut in a manner to provide a surface adjacent the rotatable shaft 24 which will feed any material getting into the spiral groove 44 back to the chamber 40.

Thus, it can be seen by an examination of FIG. 2 that spiral grooves 42 and 44 are cut in opposite directions so that both spiral grooves serve to carry material toward the chamber 40. A discharge port 46 extends from the chamber 40 through seal 30 to the outside surface of seal 30.

In operation, steam or other heating media are fed through coils 38 to raise the temperature of the seal 30 to near the melting point of the viscoelastic material being melted. For example, certain thermoplastic materials melt at about 350° F. As the material being handled is fed by screw 14 through barrel 18, some of the material will have a tendency to leak from the enclosure 26. As the shaft 24 rotates, the material is conveyed along the spiral groove 42 in a direction outwardly from the enclosure 26. Shear of the material caught in the close clearance between the shaft 24 and the inner surface of seal 30 will cause enough heat buildup to assure that the material is completely melted. The melted material is conveyed along spiral groove 42 and collected in circular groove 40.

Any material that is forced past the circular groove 40 is returned to the circular groove 40 by the reverse pitch of the spiral groove 44. The highly viscous material will accumulate in the circular groove 40. When the circular groove 40 becomes full, the continued incoming of additional material will force the accumulated material out of the discharge port 46. The material from discharge port 46 is then collected and disposed of. The leakage rate from discharge port 46 may be controlled by additional heating or cooling applied through coils 38 in grooves 36.

Some of the advantages of my new shaft seal are:
(1) The pitch direction of spiral groove 42 prevents the material undergoing treatment from becoming degraded by material being forced back into the enclosure 26 after it has become contaminated by seeping between the shaft 24 and seal 30.
(2) Random leakage of material around the circumference of the shaft 24 is eliminated.

I claim:
1. In combination:
   an enclosure for handling viscous materials having a shaft extending from one end thereof, said shaft being an integral part of a screw for conveying said viscous materials in said enclosure away from said end of the enclosure; and a member connected to the enclosure and about the rotatable shaft which prevents the viscous materials which enter the member being forced back into the enclosure, said member having a chamber formed adjacent the rotatable shaft, and the surfaces adjacent the rotatable shaft and on each side of the chamber being formed to carry material toward the chamber, said member also having a discharge port extending from the chamber to its outside surface and outside the enclosure.

2. The combination in accordance with claim 1 wherein the chamber is a circular groove.

3. The combination in accordance with claim 1 wherein the surfaces adjacent the rotatable shaft and on each side of the chamber are formed by cutting spiral grooves in said surfaces in a direction to force the viscous materials toward the chamber.

References Cited

UNITED STATES PATENTS 2,487,177  11/1949  Pollock _____ 277—134 X
2,920,347  1/1960  Joukainen et al.  277—134 X SAMUEL ROTHBERG, *Primary Examiner.*